United States Patent
Coussirou et al.

(10) Patent No.: US 12,372,004 B2
(45) Date of Patent: Jul. 29, 2025

(54) TURBINE BLADE FOR AN AIRCRAFT TURBOMACHINE, PROVIDED WITH A CHANNEL FOR EJECTING A PRIMARY FLOW TOWARDS AN INTER-LIP CAVITY

(71) Applicant: SAFRAN AIRCRAFT ENGINES, Paris (FR)

(72) Inventors: Jean Charles Marie Coussirou, Moissy-Cramayel (FR); Thomas Langevin, Moissy-Cramayel (FR); Benoit Guillaume Silet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/256,317

(22) PCT Filed: Dec. 1, 2021

(86) PCT No.: PCT/FR2021/052170
§ 371 (c)(1),
(2) Date: Jun. 7, 2023

(87) PCT Pub. No.: WO2022/123148
PCT Pub. Date: Jun. 16, 2022

(65) Prior Publication Data
US 2024/0035391 A1    Feb. 1, 2024

(30) Foreign Application Priority Data
Dec. 10, 2020    (FR) ...................................... 2012975

(51) Int. Cl.
*F01D 11/12*    (2006.01)
*B33Y 80/00*    (2015.01)
(Continued)

(52) U.S. Cl.
CPC ............ *F01D 11/122* (2013.01); *F01D 5/143* (2013.01); *F01D 5/145* (2013.01); *F01D 5/147* (2013.01);
(Continued)

(58) Field of Classification Search
CPC ........ F01D 5/145; F01D 5/143; F01D 11/001; F01D 11/04; F01D 11/06; F01D 11/122;
(Continued)

(56) References Cited

U.S. PATENT DOCUMENTS

| | | |
|---|---|---|
| 4,534,701 A | 8/1985 | Wisser |
| 8,202,039 B2 | 6/2012 | Guemmer |

(Continued)

FOREIGN PATENT DOCUMENTS

| | | |
|---|---|---|
| FR | 2 999 249 A1 | 6/2014 |
| JP | 55-146201 A | 11/1980 |
| JP | 56-47603 A | 4/1981 |

OTHER PUBLICATIONS

English machine translation of FR 2999249A1, Dec. 2, 2023.*

(Continued)

*Primary Examiner* — Christopher Verdier
(74) *Attorney, Agent, or Firm* — Oblon, McClelland, Maier & Neustadt, L.L.P.

(57) ABSTRACT

A blade and a sealing element forming an assembly for a turbomachine turbine. The blade includes an airfoil and a platform to which the sealing element is connected. An internal channel passes through the platform so as to draw off fluid circulating in a primary duct that it delimits and to inject the thus drawn-off fluid into an inter-lip cavity delimited by the sealing element.

8 Claims, 6 Drawing Sheets

(51) Int. Cl.
  *F01D 5/14* (2006.01)
  *F01D 11/00* (2006.01)
  *F01D 11/04* (2006.01)
  *F01D 11/10* (2006.01)

(52) U.S. Cl.
  CPC ............ *F01D 11/001* (2013.01); *F01D 11/04* (2013.01); *F01D 11/10* (2013.01); *B33Y 80/00* (2014.12); *F05D 2220/323* (2013.01); *F05D 2240/80* (2013.01)

(58) Field of Classification Search
  CPC ...... F01D 11/127; F01D 11/10; F04D 29/682; F04D 29/684; F05D 2240/80
  See application file for complete search history.

(56) References Cited

U.S. PATENT DOCUMENTS

| | | |
|---|---|---|
| 10,794,209 B2 | 10/2020 | Matsumoto et al. |
| 2010/0254802 A1* | 10/2010 | Freeman ................ F01D 5/145 415/115 |
| 2011/0044798 A1* | 2/2011 | Digard Brou De Cuissart .......... F01D 11/001 415/115 |
| 2011/0052380 A1* | 3/2011 | Bariaud .................. F01D 9/042 415/182.1 |
| 2011/0127352 A1* | 6/2011 | Fachat .................. F01D 11/001 239/265.15 |
| 2016/0153286 A1* | 6/2016 | Suciu ..................... F01D 11/18 415/191 |
| 2017/0002678 A1* | 1/2017 | Subramanian ........ F04D 29/542 |
| 2018/0231026 A1* | 8/2018 | Namadevan ............ F01D 11/04 |
| 2019/0085713 A1* | 3/2019 | Delaporte ............ F01D 25/246 |

OTHER PUBLICATIONS

French Search Report issued Sep. 7, 2021 in French Application 2012975 filed on Dec. 10, 2020 (with English Translation of Categories of cited documents) 10 pages.
International Search Report issued May 4, 2022 in PCT/FR/2021/052170 filed on Dec. 1, 2021 2 pages.

* cited by examiner

TURBINE BLADE FOR AN AIRCRAFT TURBOMACHINE, PROVIDED WITH A CHANNEL FOR EJECTING A PRIMARY FLOW TOWARDS AN INTER-LIP CAVITY

TECHNICAL FIELD

The invention relates to the field of turbines for an aircraft turbomachine.

PRIOR ART

A conventional turbine of an aircraft turbomachine comprises one or more stages each comprising a stator and a rotor wheel. The stator comprises stationary blades connected by their radially outer end to a casing and which are distributed circumferentially around a longitudinal central axis of the turbine so as to form a stator ring. The rotor wheel comprises a disc and blades connected to the disc by their radially inner end while being circumferentially distributed around the disc. The stator of a stage is configured so that a flow of fluid penetrating into this stage, typically comprising gases coming from a combustion chamber, is accelerated and deflected by the stator blades in the direction of the blades of the rotor wheel of this stage so as to drive the latter in rotation about the longitudinal central axis.

In general, each stator and rotor blade of the turbine comprises an airfoil and two platforms that radially delimit between them a circumferential portion of an annular primary duct in which the blade extends. The fluid passing through the turbine flows mainly in this primary duct.

During the operation of a conventional turbine, the interaction of the fluid with the stators and the rotor wheels produces vortices at the platforms of the blades, forming "secondary" flows.

To illustrate this phenomenon, FIG. 1 shows a part of two blades 1A and 1B of a turbine stator 1, these blades 1A and 1B being circumferentially adjacent with respect to one another. FIG. 1 more particularly shows a radially inner part of an airfoil 2 and a platform 3 of each of the blades 1A and 1B. The airfoil 2 of each blade 1A and 1B comprises a leading edge 4, a trailing edge 5, a lower surface 6 and an upper surface 7. The platform 3 of each blade 1A and 1B delimits radially towards the inside a circumferential portion of an annular primary duct in which a fluid flows in a direction S1 going from the leading edge 4 towards the trailing edge 5 of the airfoils 2.

Given the typical viscosity of the fluid circulating in the primary duct of a turbine, its flow along the surface of the platforms 3 has a speed gradient GV1 such that, in the vicinity of this surface, the speed of a layer of fluid is lower when this layer is closer to this surface. Moreover, the fluid flowing in the primary duct is subjected to a pressure gradient GP1 oriented in this example from the lower surface 6 of the airfoil 2 of the blade 1B towards the upper surface 7 of the airfoil 2 of the blade 1A. The pressure gradient GP1 is generally sufficient to deflect the layers of fluid flowing near the surface of the platforms 3.

This results in the appearance of various types of vortices. A first type of vortices T1, called "in the shape of a horseshoe", takes the shape of two counter-rotating branches distributed on either side of the airfoils 2. A second type of vortices T2, called "passage vortices", develop between two adjacent airfoils 2. A third type of vortices T3, called "corner vortices", run along the connection lines between the airfoil 2 and the platform 3 of each blade.

Such secondary flows T1, T2 and T3, which typically occur at the root and at the tip of the airfoils 2, are not oriented in the main direction S1 of flow of the fluid passing through the primary duct and consequently lead to a decrease in the efficiency and an increase in the consumption of kerosene of the turbomachine.

DISCLOSURE OF THE INVENTION

One goal of the invention is to limit the formation of such secondary flows or to reduce the intensity thereof.

The invention is aimed more generally at improving the performance of a turbomachine turbine.

For this purpose, the object of the invention is an assembly for a turbomachine turbine.

The internal channel allows to suck up a part of the fluid flowing along the first surface of the platform and avoid this part of fluid contributing to the formation of secondary flows.

The invention thus allows to limit the formation of secondary flows and to reduce the intensity of the secondary flows that are nevertheless capable of occurring, thus improving the efficiency and reducing the kerosene consumption of the turbomachine.

The fluid circulating in the primary duct and arriving at the at least one suction opening is indeed sucked up into the at least one internal channel given the static pressure differential between the region of the primary duct surrounding the at least one suction opening and the region surrounding the at least one ejection opening.

Given the general architecture of a turbine capable of being equipped with such an assembly, the region surrounding the at least one ejection opening is located outside of the primary duct and has a lower static pressure than the region of the primary duct into which the at least one suction opening opens.

The at least one internal channel thus forms a passive suction system that does not require any additional suction device for example with mechanical or electric control.

The invention thus allows to reduce the formation and/or the intensity of the secondary flows while avoiding generating losses of mixture such as those that would result from a direct reinsertion, into the primary duct, of the fluid thus sucked up.

Moreover, the injection of the fluid thus sucked up into the inter-lip cavity allows to pressurise the latter and to consequently reduce the pressure differential between this cavity and an upstream cavity extending upstream of the lips, outside of the primary duct.

This results in an overall improvement in the sealing leading in particular to a reduction in the flow rate of fluid tending to escape from the primary duct in the direction of this upstream cavity.

Preferably, the sealing element is annular.

In one embodiment, the upstream part of the platform is delimited by an imaginary line located equidistantly from the leading edge and from the trailing edge of the airfoil.

According to a first alternative embodiment, at least one out of the suction opening(s) is positioned upstream of the leading edge of the airfoil relative to the direction of flow of the fluid in the primary duct.

According to a second alternative embodiment, at least one out of the suction opening(s) is positioned, relative to the direction of flow of the fluid in the primary duct, downstream of the leading edge of the airfoil and upstream of the trailing edge of the airfoil.

These alternatives can be combined.

For example, according to a third alternative embodiment, at least one of the suction openings is positioned upstream of the leading edge of the airfoil relative to the direction of flow of the fluid in the primary duct and at least one other of said suction openings is positioned, relative to the direction of flow of the fluid in the primary duct, downstream of the leading edge of the airfoil and upstream of the trailing edge of the airfoil.

In one embodiment, the at least one internal channel comprises several internal channels fluidly independent of each other.

In another embodiment, the at least one internal channel comprises several internal channels fluidly connected to each other.

The at least one internal channel can also comprise a first internal channel and a series of other internal channels fluidly connected to each other and fluidly independent of the first internal channel.

According to another alternative, the at least one internal channel can also comprise a first series of internal channels fluidly independent of each other and a second series of internal channels fluidly connected to each other and fluidly independent of the first series of internal channels.

In one embodiment, the at least one suction opening is disposed on a lower-surface side of the airfoil.

In one embodiment, the assembly comprises said abradable and a rotor element carrying said lips of the dynamic sealing joint, the inter-lip cavity extending longitudinally between two of said lips and radially between the abradable and the rotor element carrying the lips.

In one embodiment, the blade is intended to be fastened to a casing of the turbomachine, the sealing element forming an abradable and being carried by a root of the blade, the abradable being intended to cooperate with lips carried by a rotor of the turbomachine.

The internal channel includes an angled portion passing through the platform, and a radially extending portion passing through the root and the sealing element.

The object of the invention is also a turbine for a turbomachine, comprising an assembly as defined above.

The object of the invention is also a turbomachine comprising such a turbine.

According to another aspect, the object of the invention is a method for manufacturing an assembly as defined above.

Preferably, this method comprises a step of additive manufacturing of the at least one blade of this assembly.

Other advantages and features of the invention will appear upon reading the detailed description, non-limiting, that follows.

BRIEF DESCRIPTION OF THE DRAWINGS

The following detailed description refers to the appended drawings in which.

DETAILED DESCRIPTION OF EMBODIMENTS

The drawings comprise a reference frame L, R and C respectively defining longitudinal (or axial), radial and circumferential directions orthogonal to each other.

Figure 1:
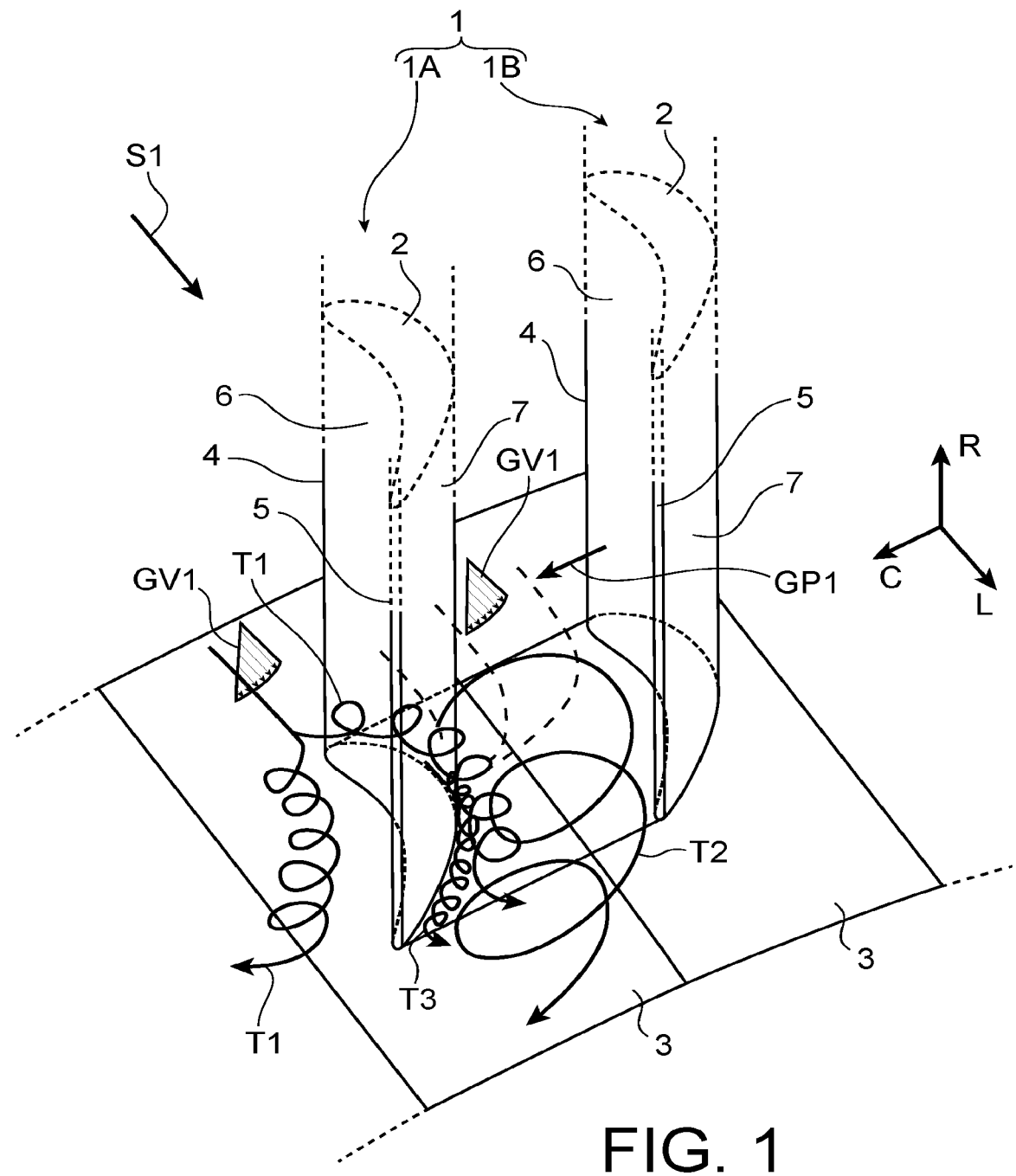
FIG. 1 is a partial perspective diagram, already described above, of a stator of a conventional turbine for an aircraft turbomachine, illustrating secondary flows that occur during the operation of the turbine.
Figure 2:
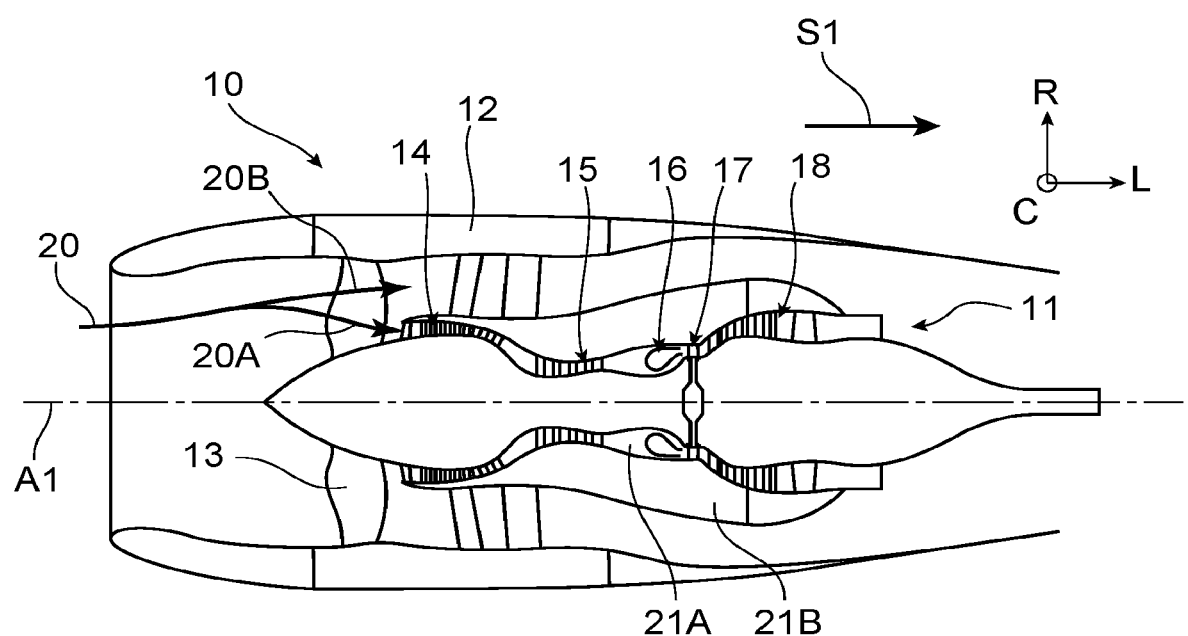
FIG. 2 is a diagram of an axial cross-section of an aircraft propulsion assembly.

FIG. 2 shows an aircraft propulsion assembly 10 comprising a turbomachine 11 faired by a nacelle 12. In this example, the turbomachine 11 is a dual-flow two-spool turbojet.

Hereinafter, the terms "upstream" and "downstream" are defined with respect to a direction S1 of flow of the gases through the propulsion assembly 10 when the latter is propelled.

The turbojet 11 has a longitudinal central axis A1 around which its various components extend, in this case, from upstream to downstream, a fan 13, a low-pressure compressor 14, a high-pressure compressor 15, a combustion chamber 16, a high-pressure turbine 17 and a low-pressure turbine 18. The compressors 14 and 15, the combustion chamber 16 and the turbines 17 and 18 form a gas generator.

During the operation of the turbojet 11, a flow of air 20 penetrates into the propulsion assembly 10 by an air inlet upstream of the nacelle 12, passes through the fan 13 then is divided into a central primary flow 20A and a bypass flow 20B.

The primary flow 20A flows in a primary duct 21A for circulation of the gases passing through the gas generator. As for the bypass flow 20B, it flows in a bypass duct 21B surrounding the gas generator and delimited radially towards the outside by the nacelle 12.

In one embodiment, the low-pressure turbine 18 is as described below in reference to FIG. 3 which shows the turbine 18 according to a radial plane that comprises the longitudinal central axis A1.

The longitudinal central axis A1 corresponds to the axis of rotation of the rotor of this turbine 18.

In this example, the turbine 18 comprises four stages each comprising a stator 25 and a rotor wheel 26.

In a manner known per se, the rotor wheels 26 are assembled axially to each other by annular flanges 27 and form the rotor of the turbine 18. As for the stators 25, they are connected to a casing 28 to form the stator of the turbine 18.

Each stator 25 comprises a plurality of blades 30 circumferentially distributed around the axis A1. In reference to the stator 25 of the last stage of the turbine 18, only one blade 30 of which is visible in FIG. 3, the blades 30 each comprise an airfoil 31, an inner platform 32 and an outer platform 33. The blades 30 are each connected to the casing 28 by a hooking element rigidly connected to their outer platform 33.

Each rotor wheel 26 comprises a disc 35 and a plurality of blades 36 circumferentially distributed around the axis A1. In reference to the rotor wheel 26 of the last stage of the turbine 18, only one blade 36 of which is visible in FIG. 3, the blades 36 each comprise an airfoil 37, an inner platform 38 and an outer platform 39. The blades 36 are each connected to the disc 35 by a root rigidly connected to their inner platform 38.

For each stator 25 blade 30, the platforms 32 and 33 each comprise a first surface from which the blade 31 extends and which delimits a circumferential portion of the primary duct 21A in which the primary flow 20A circulates. Thus, the first surface of the inner platform 32 of each blade 30 delimits the primary duct 21A radially towards the inside while the first surface of the outer platform 33 of each blade 30 delimits the primary duct 21A radially towards the outside.

Likewise, for each rotor wheel 26 blade 36, the platforms 38 and 39 each comprise a first surface from which the blade 37 extends and which delimits a circumferential portion of the primary duct 21A. Thus, the first surface of the inner platform 38 of each blade 36 delimits the primary duct 21A radially towards the inside while the first surface of the outer platform 39 of each blade 36 delimits the primary duct 21A radially towards the outside.

Figure 3:
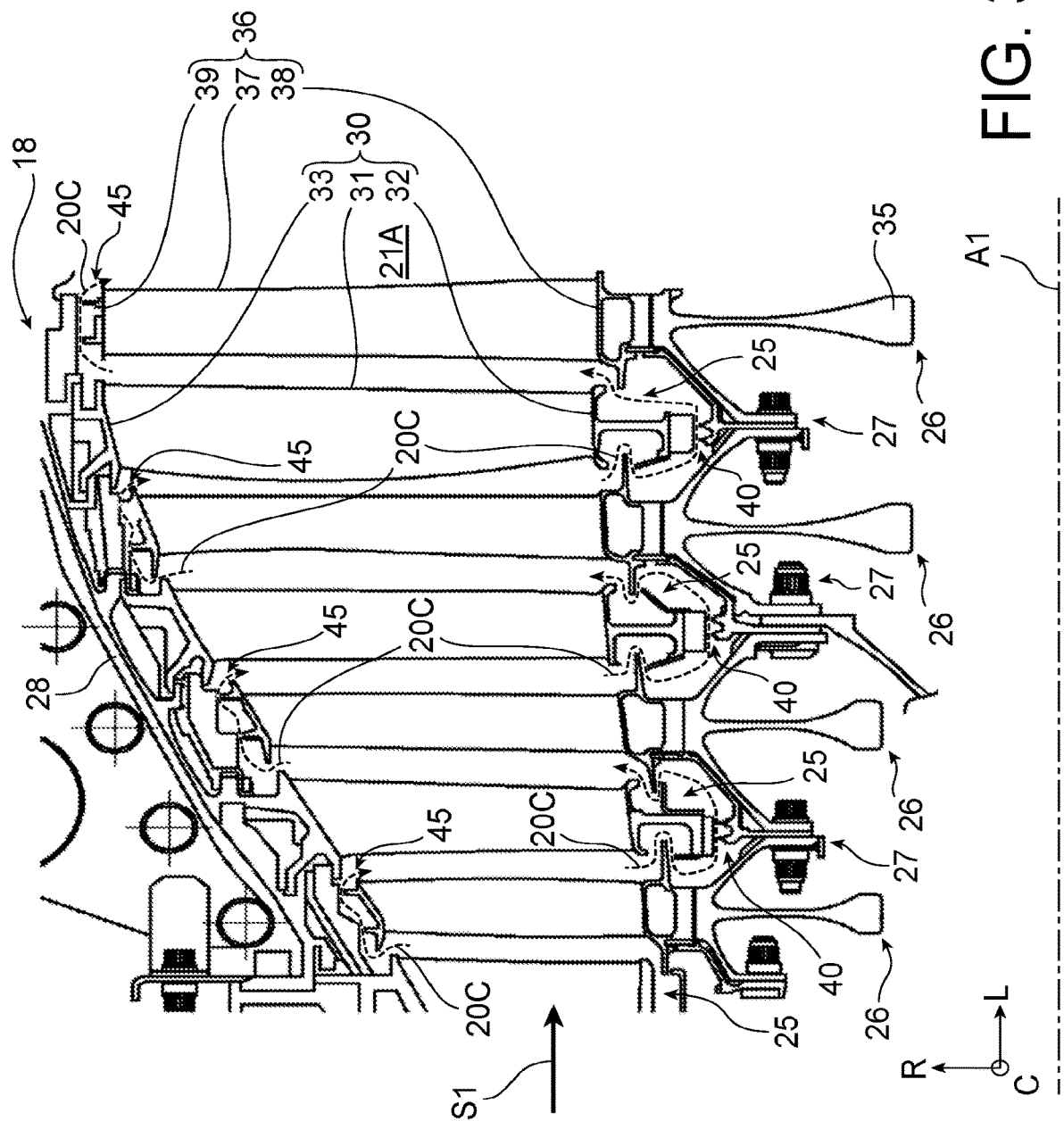
FIG. 3 is a partial half-diagram of an axial cross-section of a low-pressure turbine of a turbomachine.

In the turbine 18 of FIG. 3, the primary duct 21A is consequently globally annular.

In another exemplary embodiment, the low-pressure turbine 18 is as described below in reference to FIG. 4.

Figure 4:
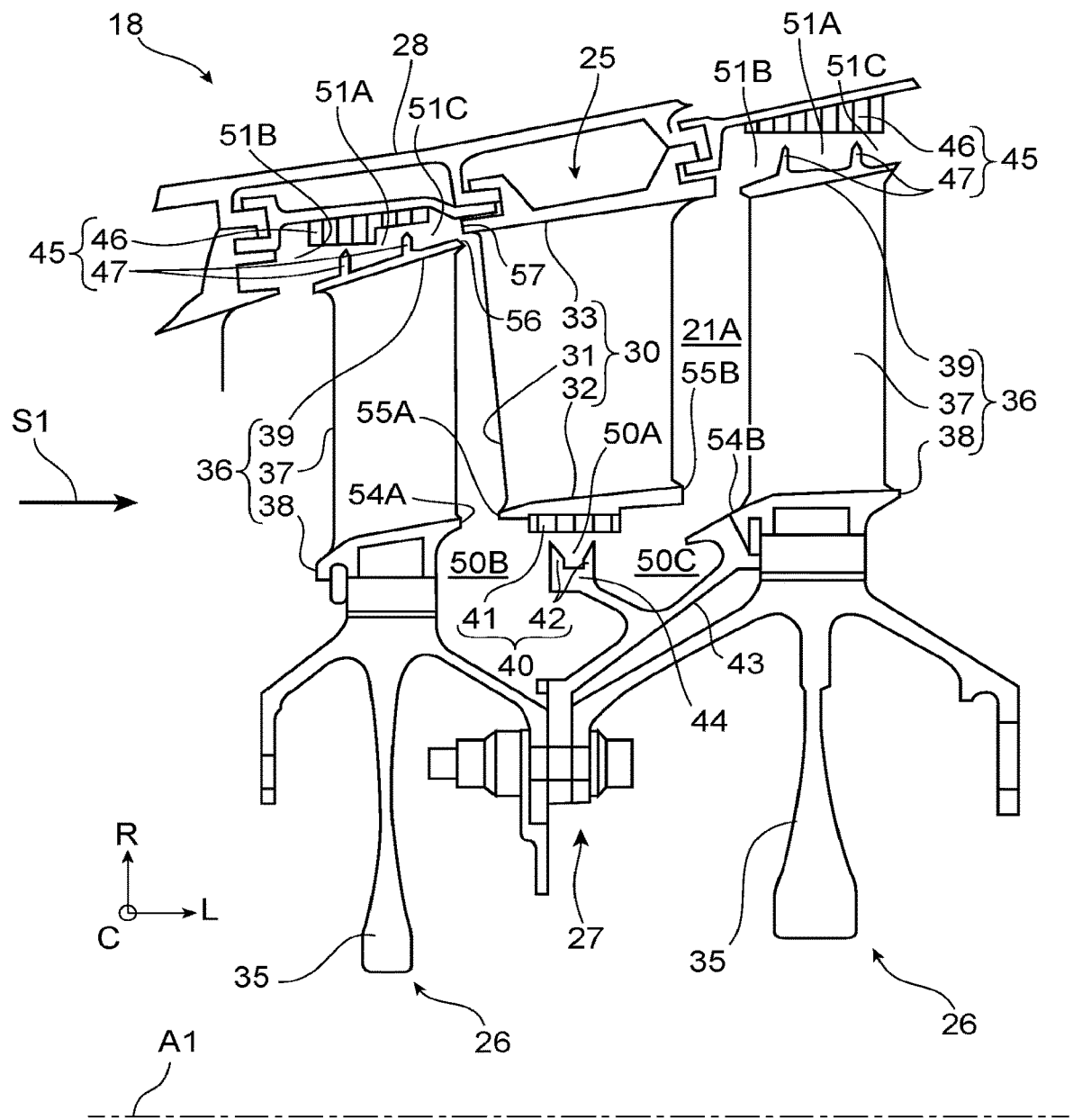
FIG. 4 is a partial half-diagram of an axial cross-section of a low-pressure turbine of a turbomachine.

FIG. 4 shows a part of a turbine 18 of the same type as that of FIG. 3, centred on a stator 25, a rotor wheel 26 belonging to the same stage as this stator 25 (on the right in FIG. 4) and a rotor wheel 26 of a lower stage (on the left in FIG. 4).

In the example of FIG. 4, the turbine 18 comprises a dynamic sealing joint 40 allowing to limit the circulation of gas radially below the stator 25.

In a manner known per se, the joint 40 comprises two sealing elements, one forming an abradable wearing part 41, the other forming lips 42.

In this example, the abradable 41 is an annular part connected to the inner platform 32 of the blades 30 of the stator 25, so that the abradable 41 and the blades 30 are constrained to rotate together about the axis A1.

The sealing element forming the lips 42 comprises in this example a sealing part 44 that carries lips and which is carried by an annular shroud 43 constrained to rotate with the rotor wheels 26 about the axis A1.

The joint 40 forms an inter-lip cavity 50A extending longitudinally between the lips 42 and which is radially delimited on the one hand by the abradable 41 and on the other hand by the sealing part 44.

The turbine 18 of FIG. 4 also comprises dynamic sealing joints 45 allowing to limit the circulation of gas radially above the rotor wheels 26.

In a manner similar to the joint 40, each of the joints 45 comprises two sealing elements, one forming an abradable wearing part 46, the other forming lips 47.

In this example, the abradable 46 of each of the joints 45 is stationarily connected to the casing 28 while the lips 47 are formed on the outer platform 39 of the blades 36 of the rotor wheels 26, so that the lips 47 and the rotor wheels 26 are constrained to rotate together about the axis A1.

For each of the joints 45, the joint 45 forms an inter-lip cavity 51A extending longitudinally between the lips 47 of this joint 45 and which is radially delimited on the one hand by the abradable 46 of this joint 45 and on the other hand by a part of the outer platform 39 of the blade 36 to which the lips 47 are connected.

The turbine 18 of FIG. 3 also comprises dynamic sealing joints 40 and 45 of the same type allowing to limit the circulation of gas respectively radially below the stators 25 and radially above the rotor wheels 26.

Such dynamic sealing joints 40 and 45 thus limit but do not totally prevent any circulation of gas outside of the primary duct 21A given in particular the play that results from the thermal expansion and from the relative movement of the various fixed and mobile parts of the turbine 18.

A part of the primary flow 20A consequently produces a bypass flow 20C as schematically illustrated in FIG. 3.

Such a bypass flow passes more precisely through cavities including in this example the cavities 50B, 50C, 51B and 51C labelled in FIG. 4.

The cavities 50B, 50C, 51B and 51C extend radially outside of the primary duct 21A, on either side of the joints 40 and 45, and are fluidly connected to the primary duct 21A by openings or play between rotor wheels 26 and stators 25.

In this example, the cavity 50B is delimited radially towards the outside by the inner platform 32 of the blades 30 of the stator 25 and axially downstream by the dynamic sealing joint 40. The cavity 50C is also delimited radially towards the outside by the inner platform 32 of the blades 30 of the stator 25 and axially upstream by the dynamic sealing joint 40.

Given the relative axial position of the cavities 50B and 50C with respect to the joint 40, said cavities are respectively called "upstream cavity" and "downstream cavity".

In an analogous manner, each of the joints 45 axially delimits an upstream cavity 51B and a downstream cavity 51C which are each radially delimited towards the inside by the outer platform 39 of the blades 36 of the corresponding rotor wheel 26.

The upstream cavity 50B is fluidly connected to the primary duct 21A by an annular opening extending axially and/or radially between a downstream end 54A of the inner platform 38 of the blades 36 of the rotor wheel 26 located upstream of the stator 25 and an upstream end 55A of the inner platform 32 of the blades 30 of the stator 25.

The downstream cavity 50C is fluidly connected to the primary duct 21A by an annular opening extending axially and/or radially between a downstream end 55B of the inner platform 32 of the blades 30 of the stator 25 and an upstream end 54B of the inner platform 38 of the blades 36 of the rotor wheel 26 located downstream of the stator 25.

The cavities 51B and 51C are also fluidly connected to the primary duct 21A in an analogous manner (see FIG. 4).

Figure 5:
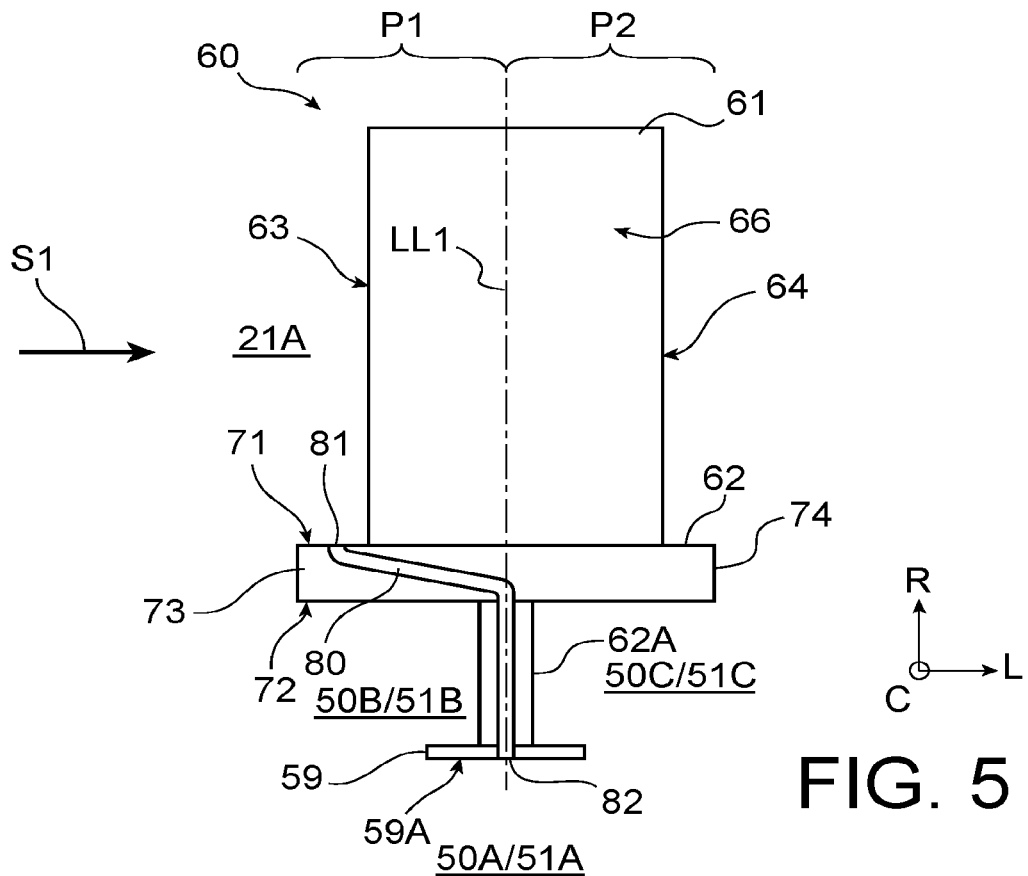
FIG. 5 is a simplified diagram of a blade and of a sealing element according to the invention, comprising an internal channel configured to draw off jet air and inject it into an inter-lip cavity delimited by the sealing element.

FIG. 5 schematically illustrates a sealing element 59 and a part of a blade 60 forming an assembly according to the invention.

The blade 60 comprises an airfoil 61 and a platform 62.

The platform 62 comprises a root 62A that extends from the platform 62 radially on a side opposite to the airfoil 61.

The sealing element 59 is connected to the root 62A of the platform 62, for example by brazing or welding.

In this in no way limiting example, the blade 60 corresponds to one of the blades 30 of one of the stators 25 of the turbine 18 of FIG. 3 or 4 so that the platform 62 of the blade 60 corresponds to the inner platform 32 of this blade 30. The sealing element 59 comprises in this example the abradable 41 of the joint 40 extending radially under this stator 25. In FIG. 5, the element 59 schematically illustrates the abradable and its support.

The airfoil 61 of the blade 60 comprises a leading edge 63, a trailing edge 64, a lower surface (not visible) and an upper surface 66.

The platform 62 of the blade 60 comprises a first surface 71 and a second surface 72 radially opposite with respect to one another.

The platform 62 comprises an upstream end 73 and a downstream end 74.

In the simplified diagram of FIG. 5, the first surface 71 and the second surface 72 are parallel to one another and to the longitudinal direction L. Of course, each of these surfaces can have another geometry and be globally oriented according to a direction oblique with respect to the longitudinal L and radial R directions, like the platform 32 of the blade 30 of FIG. 4.

FIG. 5 shows an imaginary line LL1 located equidistantly from the leading edge 63 and from the trailing edge 64 of the airfoil 61.

In the simplified diagram of FIG. 5, the leading edge 63 and the trailing edge 64 are rectilinear and parallel to one another. Of course, each of these edges can have a non-rectilinear geometry and be globally oriented according to a direction oblique with respect to the radial direction R, like the leading edge of the airfoil 31 of the blade 30 of FIG. 4. In general, the imaginary line LL1 is not therefore necessarily straight.

The imaginary line LL1 delimits an upstream part P1 and a downstream part P2 of the platform 62.

When the blade 60 is provided in one of the stators 25 of the turbine 18 of FIG. 3 or 4, the first surface 71 of the platform 62 delimits radially towards the inside of the primary duct 21A and the direction S1 of flow of the primary flow 20A is directed from the leading edge 63 towards the trailing edge 64 of the airfoil 61 and from the upstream part P1 towards the downstream part P2 of the platform 62.

In these conditions, the second surface 72 of the upstream part P1 of the platform 62 delimits radially towards the outside of the upstream cavity 50B, the second surface 72 of the downstream part P2 of the platform 62 delimits radially towards the outside of the downstream cavity 50C and the sealing element 59 forms a surface 59A that delimits radially towards the outside the inter-lip cavity 50A.

The platform 62 comprises an internal channel 80 having a suction opening 81 that opens onto the first surface 71 of the upstream part P1 of the platform 62 and an ejection opening 82 that opens onto the surface 59A formed by the sealing element 59. The internal channel 80 thus passes through the platform 62, the root 62A and the sealing element 59.

In this example, the suction opening 81 of the internal channel 80 opens more precisely upstream of the leading edge 63 of the airfoil 61.

As indicated above, the element 59 of FIG. 5 represents in this example both the abradable and its support. The surface 59A is thus in this example formed by the abradable and respective parts of the internal channel 80 are formed on the one hand by the abradable and on the other hand by its support.

Alternatively, the element 59 of FIG. 5 can represent only a supporting ring for an abradable, in which case the surface 59A is formed by the supporting ring. The abradable can comprise cells forming a honeycomb structure so that the ejection opening 82 opens into one or more of these cells which thus form extensions of the internal channel 80 to fluidly connect the latter to the inter-lip cavity 50A. The abradable having a honeycomb structure or any other structure can be locally machined so as to improve or establish such a fluid link between the channel and the inter-lip cavity 50A.

The invention covers any geometry of the internal channel 80 and of the suction 81 and ejection 82 openings provided that the internal channel 80 allows to draw off a part of the primary flow 20A in the primary duct 21A and eject it in the inter-lip cavity 50A under the effect of the static pressure differential between this primary duct 21A and this inter-lip cavity 50A.

The invention is not in any way limited to the examples illustrated in the drawings.

For example, in embodiments not shown, the platform 62 comprises one or more other internal channels fluidly independent of the internal channel 80 or fluidly connected to this internal channel 80.

Independently of the number and the geometry of the internal channels 80, the latter can comprise one or more suction openings 81 and one or more ejection openings 82.

FIGS. 6 to 9 illustrate various types of suction openings 81 that all open, in these examples, onto the first surface 71 of the platform 62 downstream, in axial proximity to the leading edge 63 of the airfoil 61.

Figure 6:
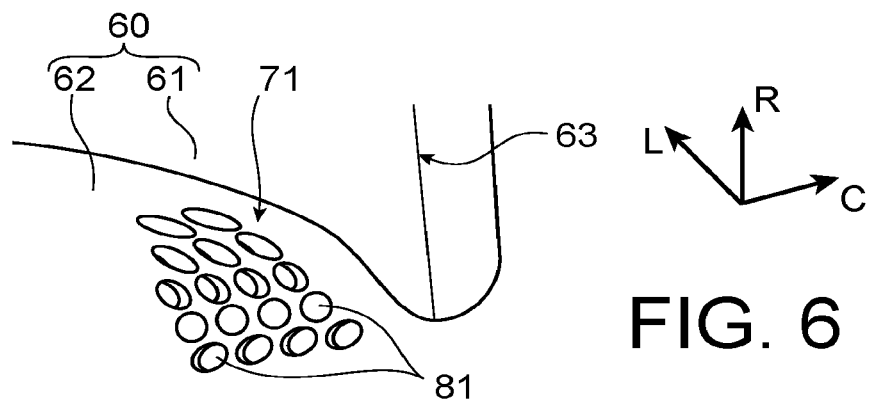
FIG. 6 is a partial perspective diagram of a blade according to the invention, showing suction openings according to a first embodiment.

In the example of FIG. 6, the platform 62 comprises an internal channel 80 having seventeen suction openings 81 having a circular cross-section obtained for example by piercing or additive manufacturing.

Figure 7:
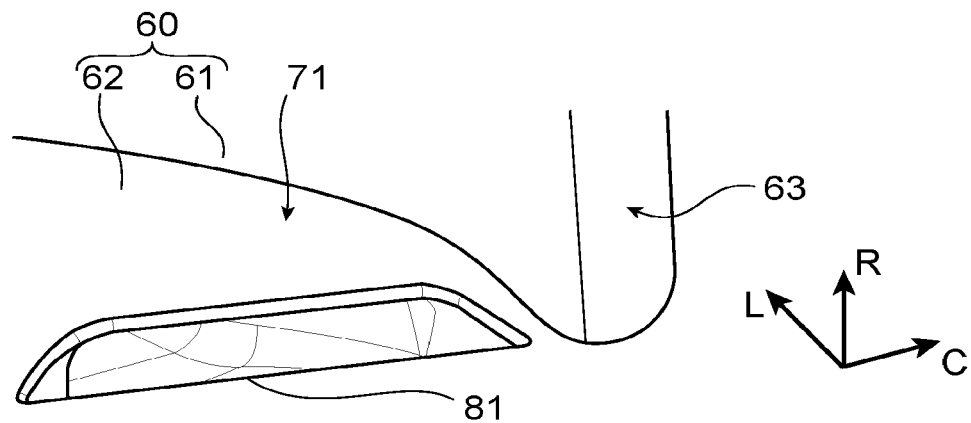
FIG. 7 is a partial perspective diagram of a blade according to the invention, showing a suction opening according to a second embodiment.

In the example of FIG. 7, the platform 62 comprises an internal channel 80 having a single suction opening 81 in the form of a groove extending in the circumferential direction C.

Figure 8:
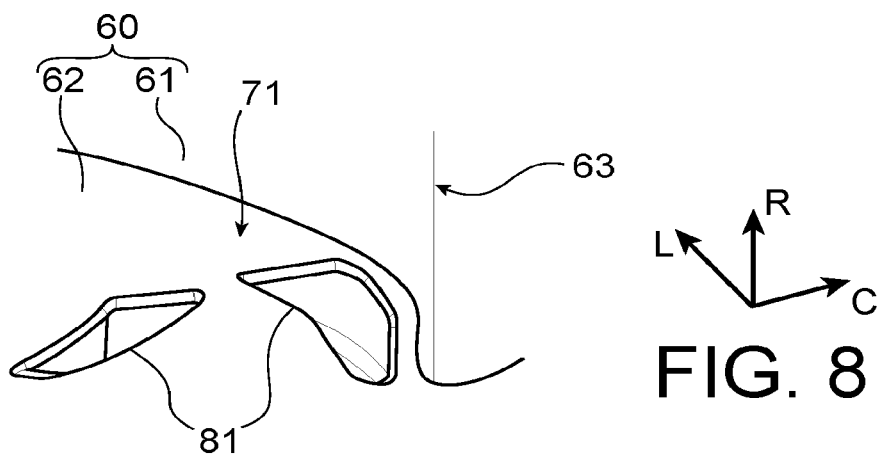
FIG. 8 is a partial perspective diagram of a blade according to the invention, showing suction openings according to a third embodiment.

In the example of FIG. 8, the platform 62 comprises an internal channel 80 having two suction openings 81 in the form of grooves extending according to a curved direction so as to run along the lower surface of the airfoil 61.

Figure 9:
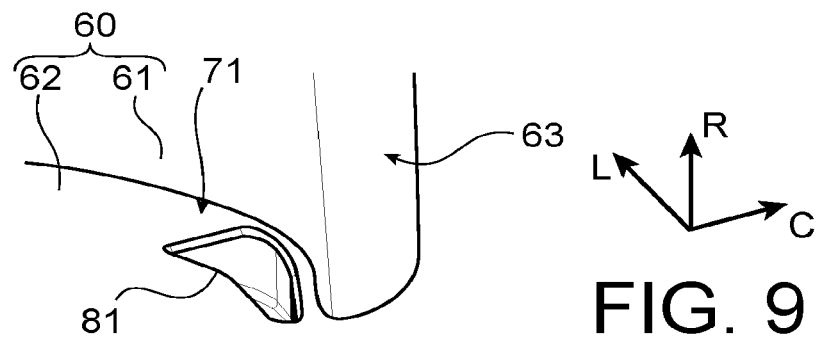
FIG. 9 is a partial perspective diagram of a blade according to the invention, showing a suction opening according to a fourth embodiment.

In the example of FIG. 9, the platform 62 comprises an internal channel 80 having a single suction opening 81 corresponding to one of the grooves of FIG. 8.

In general, the geometry of the suction opening(s) 81 is chosen in order to reduce the head losses upon suction and increase the total pressure of the flow sucked up.

For this purpose, the suction opening(s) 81 illustrated in FIGS. 6 to 9 open directly into the primary duct 21A without interposition of deflectors, fins or other obstacles and without protruding into the primary duct 21A like a scoop system would.

When the suction openings 81 are multiple like in the example of FIG. 6, the openings 81 are preferably circular in order to reduce the wetted surface and thus the friction with the air.

When the suction opening(s) 81 form mouths as illustrated in FIGS. 7 to 9, the openings 81 preferably form nozzles that can optionally extend over the entire available width between adjacent airfoils 61 (see for example FIG. 7). Such nozzles can form acute angles or have a geometry capable of generating vortices capable of increasing the total pressure of the fluid at the inlet of the internal channel 80 by sucking up air outside of the boundary layer by viscosity.

With regard to the geometry of the internal channel 80, the latter should have a circular or ovoid cross-section, without a break in surface or presence of an obstacle, in order to reduce the wetted surface in contact with the flow and the head losses.

In the case of a cross-section of ejection opening 82 smaller than a cross-section of a suction opening 81, the internal channel 80 should have a progressive restriction of cross-section allowing to preserve a Mach as low as possible in order to reduce the head losses.

These various aspects allow to increase the flow rate of air sucked up by the internal channel(s) 80 and to consequently reduce the thickness of the boundary layer downstream of the suction opening(s) 81. This results in an increased reduction of the secondary flows and of the associated losses.

Moreover, the increase of the flow rate of air injected into the inter-lip cavity improves the sealing of the joint forming this cavity.

What has just been described can be implemented for each of the blades 30 of one or more stators 25 of the turbine 18 or for only a part of these blades 30.

Moreover, what has just been described applies by analogy to the blades 36 of the rotor wheels 26 of the turbine 18. Thus, in one embodiment, one or more blades 36 of one or more rotor wheels 26 of the turbine 18 comprises an airfoil like the airfoil 61 of the blade 60 of FIG. 5, an outer platform like the platform 62 of the blade 60 of FIG. 5 and lips connected to this platform 62 so that the at least one internal channel 80 allows to draw off a part of the primary flow 20A in the primary duct 21A and to eject it in the corresponding inter-lip cavity 51A.

The invention can also be implemented in the high-pressure turbine 17 and in a turbine of a different turbomachine of the turbojet 11 of FIG. 2.

The invention claimed is:

1. An assembly for a turbine of a turbomachine extending around a longitudinal axis, comprising:
   a blade;
   a sealing element, said sealing element forming an abradable, the blade comprising a platform and an airfoil extending from the platform, the platform forming a first surface from which the airfoil extends and intended to delimit a primary duct wherein the airfoil extends in order to receive a fluid flowing in a direction going from a leading edge towards a trailing edge of the airfoil and going from an upstream part towards a downstream part of the platform, the sealing element being connected to the platform and forming a second surface intended to delimit an inter-lip cavity;
   an internal channel passing through the platform and having a suction opening which opens onto the first surface of the upstream part of the platform and an ejection opening which opens onto the second surface, the blade including a root between the platform and the sealing element, and the internal channel including an angled portion passing through the platform, and a radially extending portion passing through the root and the sealing element; and
   a rotor element carrying lips of a dynamic sealing joint, the inter-lip cavity extending longitudinally between two of said lips and radially between the abradable and the rotor element carrying the lips,
   wherein the suction opening is positioned upstream of the leading edge of the airfoil relative to a direction of flow of the fluid in the primary duct.

2. The assembly according to claim 1, wherein the sealing element is annular.

3. The assembly according to claim 1, wherein the upstream part of the platform is delimited by an imaginary line located equidistantly from the leading edge and from the trailing edge of the airfoil.

4. The assembly according to claim 1, wherein the suction opening is disposed adjacent to a lower-surface side of the airfoil.

5. The assembly according to claim 1, wherein the blade is intended to be fastened to a casing of the turbomachine, the sealing element forming the abradable and being carried by the root of the blade, the abradable being intended to cooperate with the lips carried by the rotor element.

6. A turbine for a turbomachine, comprising the assembly according to claim 1.

7. A turbomachine comprising the turbine according to claim 6.

8. A method for manufacturing the assembly according to claim 1, comprising additive manufacturing of the blade of said assembly.

\* \* \* \* \*